(12) United States Patent
Gandham et al.

(10) Patent No.: US 8,165,093 B2
(45) Date of Patent: Apr. 24, 2012

(54) METHOD FOR IP ADDRESS MANAGEMENT IN NETWORKS USING A PROXY BASED APPROACH IN MOBILE IP TELEPHONY

(75) Inventors: Shashidhar R. Gandham, Sunrise, FL (US); Jeff Mielke, Delray Beach, FL (US)

(73) Assignee: XG Technology, Inc., Sarasota, FL (US)

( * ) Notice: Subject to any disclaimer, the term of this patent is extended or adjusted under 35 U.S.C. 154(b) by 310 days.

(21) Appl. No.: 12/657,324

(22) Filed: Jan. 19, 2010

(65) Prior Publication Data

US 2010/0189073 A1 Jul. 29, 2010

Related U.S. Application Data

(60) Provisional application No. 61/205,969, filed on Jan. 26, 2009.

(51) Int. Cl.
*H04W 4/00* (2009.01)

(52) U.S. Cl. ....................................................... 370/331
(58) Field of Classification Search .................. 370/203, 370/204–215, 229–240, 241–253, 310–337, 370/338–350, 395.1, 395.3, 395.4, 395.41, 370/395.42, 395.5, 395.52, 395.53, 412–421, 370/431–457, 458–463, 464–497, 498–529
See application file for complete search history.

*Primary Examiner* — Kwang B Yao
*Assistant Examiner* — Jung-Jen Liu
(74) *Attorney, Agent, or Firm* — Dennis L. Cook, Esq.

(57) ABSTRACT

A system and method for a mobile switching center to efficiently manage; assign; and reclaim the IP addresses is described. The procedure utilizes a mechanism that involves splitting the IP address assignment functionality into two parts, with the Base Station being responsible for assigning IP addresses to individual end user devices and the mobile switching center assigning a block of IP addresses to each Base Station and includes a methodology for the mobile switching center to efficiently manage; assign and reclaim the IP addresses.

1 Claim, 4 Drawing Sheets

METHOD FOR IP ADDRESS MANAGEMENT IN NETWORKS USING A PROXY BASED APPROACH IN MOBILE IP TELEPHONY

CROSS-REFERENCE TO RELATED APPLICATION

The present application claims the benefit of previously filed Provisional Patent Application, Ser. No. 61/205,969.

FIELD OF THE INVENTION

This invention addresses the need to transport high bit-rate data and voice to multiple users over wired and wireless means. More specifically a system and method for a mobile switching center to efficiently manage; assign; and reclaim the IP addresses is disclosed.

BACKGROUND OF THE INVENTION

Specialized Modulation techniques, which have now become known by their commercial designation, xMax, were designed by xG Technology, Inc., the Assignee of this application to help alleviate the problems exhibited by ultra wide band and mono pulse modulation schemes. A system and method for a mobile switching center to efficiently manage; assign; and reclaim the IP addresses is disclosed in the preferred embodiment as being used in xMax but can be implemented on any broad band wireless technologies like WiMax, WiBro, WiFi, 3GPP and HSDPA, or any other type of wired or wireless voice or data systems.

A heterogeneous MAC protocol proposed to support VoIP traffic in xMAX wireless networks has been discussed in previously filed patent applications U.S. Ser. Nos. 12/069, 057; 12/070,815; 12/380,698; 12/384,546; 12/386,648; 12,387,811; 12/387,807, 12/456,758, 12/456,725, 12/460, 497, 12/583,627, 12/583,644, 12/590,472, 12/590,469, 12/590,931, 12/653,021 and 12/653,007 which are incorporated by reference into this disclosure. In the heterogeneous MAC protocol described in these applications, guaranteed timeslots are assigned to forward VOIP packets, temporary timeslots are assigned to forward data packets and contention based access is used to exchange control messages. Note that this heterogeneous MAC protocol is used here as a reference protocol and similarly xMAX as a reference wireless network. The idea of a system and method for a mobile switching center to efficiently manage; assign; and reclaim the IP addresses as disclosed herein can be used in other relevant systems.

BRIEF SUMMARY OF THE INVENTION

A mechanism for decreasing the latency in an IP address assignment process for mobile systems using IP as a network layer protocol is described in A Proxy Based Approach for IP Address Assignment to Decrease Latency of Hand-offs in Mobile IP Telephony Provisional Application No. 61/192, 799 by Shashidhar Gandham and Amit Shukla. The mechanism involves splitting the IP address assignment functionality into two parts, with the Base Station being responsible for assigning IP addresses to individual end user devices and the mobile switching center assigning a block of IP addresses to each Base Station. The invention mentioned above presented details about the base stations assigning IP addresses to the end user devices. In this invention disclosure a methodology for the mobile switching center to efficiently manage; assign and reclaim the IP addresses is presented. Also proposed are improvements for fault-tolerance.

DESCRIPTION OF THE DRAWINGS

For a fuller understanding of the nature and objects of the invention, reference should be made to the accompanying drawings, in which.

DETAILED DESCRIPTION OF THE INVENTION

Figure 1:
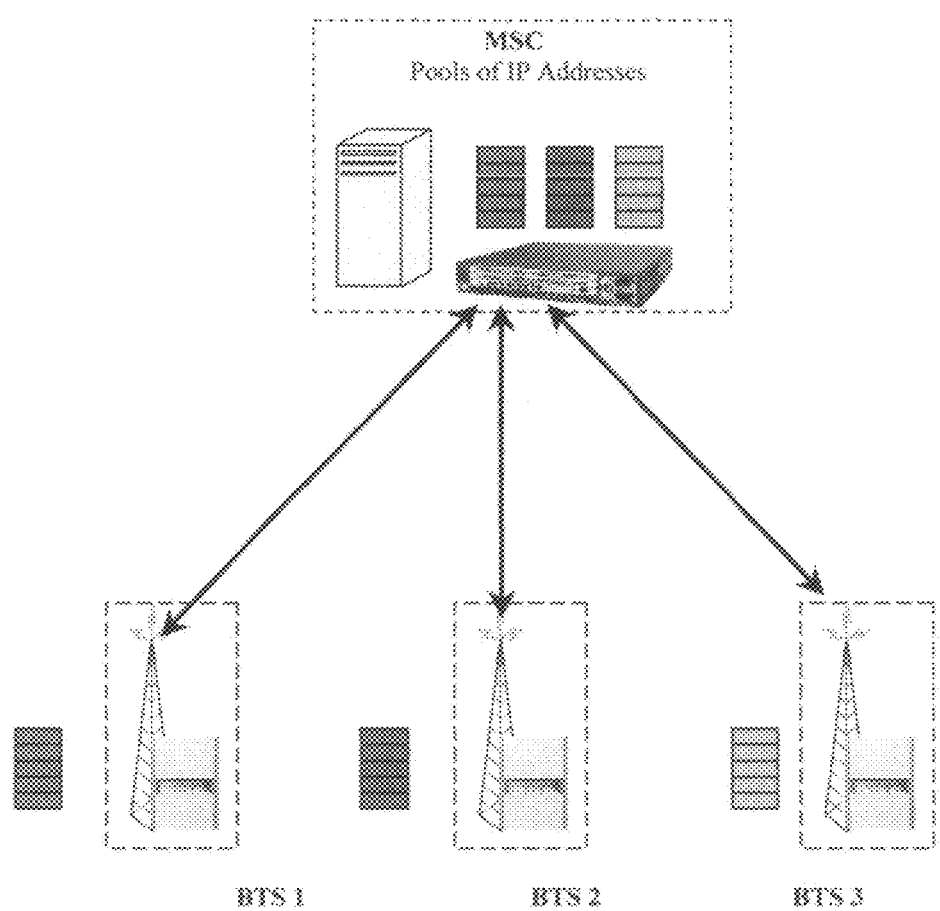
FIG. 1 is a diagram showing a multi-sector xMAX system.

In typical mobile VOIP systems (for example, xMAX) one Base Station (BTS) services multiple handsets. Similarly, one Mobile Switching Center (MSC) provides service to multiple Base Stations as shown in FIG. 1. In a typical deployment scenario, multiple Base Stations will be needed to cover a citywide area. As a user moves around, the handset will have to seamlessly hand-off from one BTS to another. One of the key requirements for any mobile VOIP system is that there should be no disruption in voice traffic during handoffs to ensure that minimal voice packets are dropped.

Each MSC forms an IP subnet. If a handset moves from one Base Station to another within the service area of the same MSC, it does not need to change its IP address. However, when a handset moves from one Mobile Switching Center (MSC) to another, it must obtain a new IP Address. The latency involved in obtaining an IP address should be negligible so that the user does not notice any appreciable drop in voice quality.

A normal Dynamic Host Configuration Protocol (DHCP) exchange involves four messages; DHCPDiscover (342 bytes), DHCPOffer (342 bytes), DHCPRequest (342 bytes), and DHCPAcknowledge (342 bytes). A typical link layer Maximum Transmit Unit (MTU) in xMAX is 64 bytes, thus a minimum of 24 fragments will be transmitted over the air. At most one fragment is transmitted in a Superframe (30 ms), thus the total latency of transmitting 24 fragments is 720 ms. This contributes to additional delay that will not be acceptable, especially during a handoff scenario. Also, at the boundary of the cell (which is typically the region where handoffs take place), signal strength is weak and link quality will be degraded. This may lead to multiple retransmissions thereby causing further delay. A new mechanism for managing, assigning, and reclaiming IP addresses is proposed in this disclosure, which allows for a much faster IP assignment.

Figure 2:
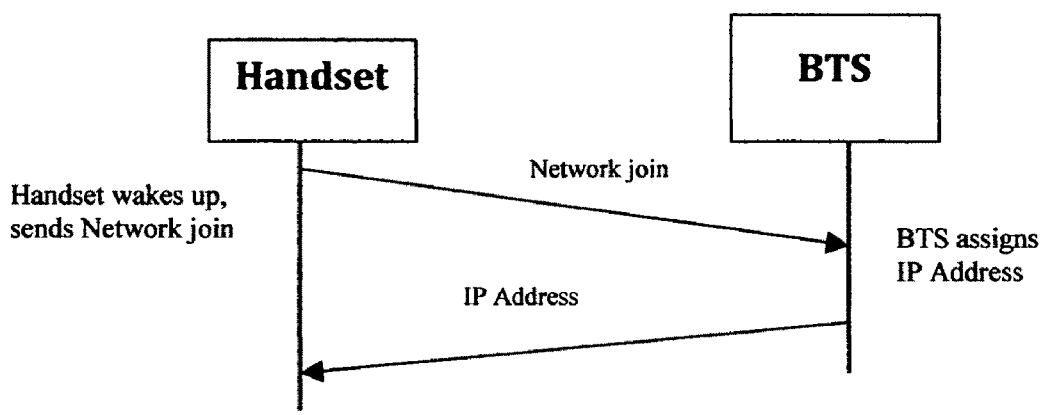
FIG. 2 is a diagram showing message flow for IP address assignment.

In this proxy based approach the Base Station will maintain a pool of IP addresses, and each handset that joins the network will be assigned an IP address from this pool. The Base Station periodically obtains a pool of IP addresses from the MSC. This way, each BTS will have a unique set of IP addresses. When a handset powers up, it will send a Network Join message. On receiving this message, the BTS, in addition to registering the handset, will send a reply that will include the IP address assigned to it as shown in FIG. 2.

The MSC has to maintain the master pool of IP addresses from which each Base Station will be assigned a distinct set of IP addresses on an on-demand basis. As shown in FIG. 1 a proxy-DHCP server residing in the MSC will be entrusted with the responsibility of efficiently assigning and reclaiming the IP addresses. This invention disclosure presents the design of one such server.

The design of the proxy server is based on the following premises: The base stations are responsible for assignment of the IP addresses to handsets which are joining the network. The handset is responsible to renew the lease of IP address that is currently assigned to it. Keep-alive messages are relied on to renew the lease on the IP address. Please refer to A Keep Alive Timeslots (KATS) Based Approach to Track Registered Handsets in xMAX Networks; Shih-Chun Chang and Shashidhar R. Gandham; U.S. application Ser. No. 12/387,811 for details on keep-alive messages. The proxy server will ensure that no duplicate IP address assignments occur and will be responsible for re-claiming unused IP addresses.

Base stations always try to maintain a set of yet-to-be assigned IP addresses such that any handset joining the network can be given one. If the pool of these IP addresses is too low, then the base station will send a request to the proxy server for additional IP addresses. On assigning a particular IP address to a handset the base station will remove it from its pool. In addition to IP assignments, the base stations generate IP lease renewal and IP free messages based on the keep-alive and network leave messages received. IP addresses corresponding to several keep-alive messages can be aggregated into one single IP lease renewal request. Note that a handset sending a keep-alive message might have joined the network at a different base station. As a result the IP address would have been assigned by a different base station. On receiving a non-hand off network leave message, the base station informs the proxy that the corresponding IP address is free to be re-assigned.

Upon receiving a request for allocating IP addresses from any base station, the proxy will send a response. The response might contain a list of IP addresses. The number of IP addresses in the response might be less than the requested number. A counter value is associated with all the IP addresses in the system. A counter value of less than eight, indicates that the IP address is in use. Before assigning an IP address the corresponding counter value is set to zero. Every three minutes, equal to the keep-alive interval, the counter value is incremented by a unit. Upon receiving a lease renewal, the counter values of the respective IP addresses are reset to zero. Note that if no lease renewal is received for a particular IP address for 24 minutes then the proxy will treat the IP address as available. On receiving a free IP address message, the proxy will set the counter value of the corresponding IP address to 9.

Figure 3:
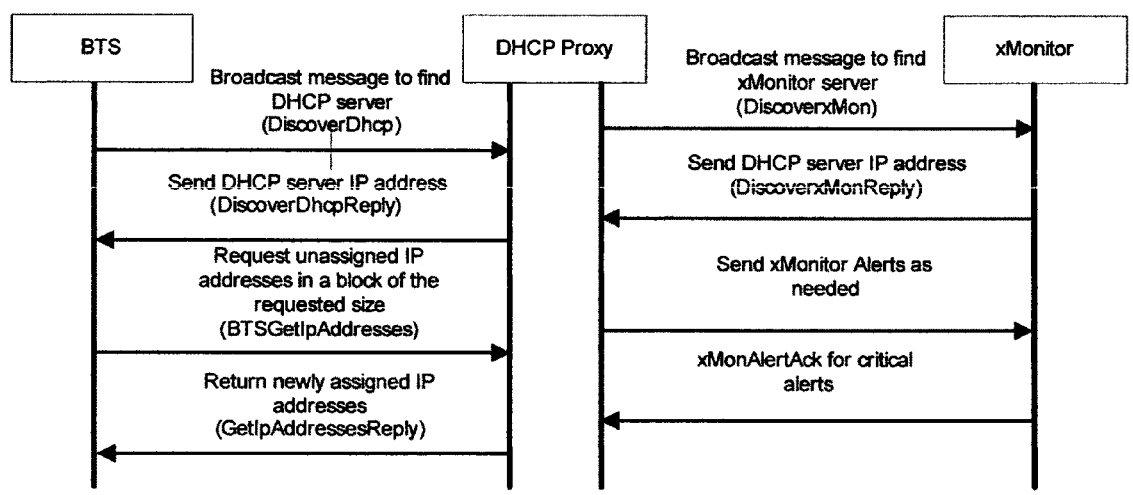
FIG. 3 is a diagram showing startup message flow; and,
FIG. 4 is a diagram showing address lease renewal message flow.

The proxy server and the base stations communicate using UDP messages. Hence, any base station that is added to a network needs to know about the IP address of the proxy server. To eliminate the need to configure each base station with the IP address of the proxy server, an auto-discovery feature is built into the proxy server. As base stations power up, they send an UDP broadcast DiscoverDhcp message requesting the proxy server to respond. Once the server receives a discovery message from a BTS, the proxy server will respond to the BTS with a DiscoverDhcpReply message that contains the DHCP servers IP address and port number for future communications. Please refer to FIG. 3 for message flows associated with auto discovery.

Whenever the base station has less that 64 available IP addresses, it sends a DhcpGetIpAddresses message to the proxy server. In the message, the base station can specify the number of IP addresses it is requesting. At most 256 IP addresses can be requested. The proxy server might respond with 256 or less IP addresses based on the availability of IP addresses.

In addition to the requested number of IP addresses, the DhcpGetIpAddresses message contains a RequestCounter. The RequestCounter is incremented with every new request for IP addresses. The RequestCounter value is not incremented if the DhcpGetIpAddresses message has to be retransmitted. If the base station does not get a response for DhcpGetIpAddresses, it re-transmits the request. The wait time for retransmission of the message follows an exponential back-off procedure. The proxy server will note the last received RequestCounter and the last response sent to every base station. On receiving a DhcpGetIpAddresses message the proxy server checks if the RequestCounter is same as the one it last received from the base station. If it is the same, then it simply resends the response that it sent last time.

When the proxy server does not have any available IP addresses, the response to DhcpGetIpAddresses will not have any IP addresses. In such scenarios, the base station retransmits the request following binary exponential back-off procedure.

The base station is responsible for sending a DhcpRenewLease message once every 3 minutes for all the IP addresses that are yet to be assigned to the handsets. In addition, it needs to send DhcpRenewLease messages on behalf of the handsets that are currently registered with it. Note that all the handsets are sending a keep-alive message once every 3 minutes to the base station. In each super-frame, the base station may receive at most 18 (one per channel) keep-alive messages. The base stations accumulate all the keep-alive messages received in 14 super-frames and send a cumulative DhcpRenewLease message to the proxy server. Note that these messages have at most 252(14*18) IP addresses. The DhcpRenewLease message will cause the IpLeaseRenewalCount for corresponding IP address to be reset to zero.

If the base station receives a non-hand off network leave message from any handset, then it informs the proxy server that the corresponding IP address is free to be re-assigned. On receiving a DhcpFreeIP the proxy server will set the IpLeaseRenewalCount for the corresponding IP address to 9.

Figure 4:
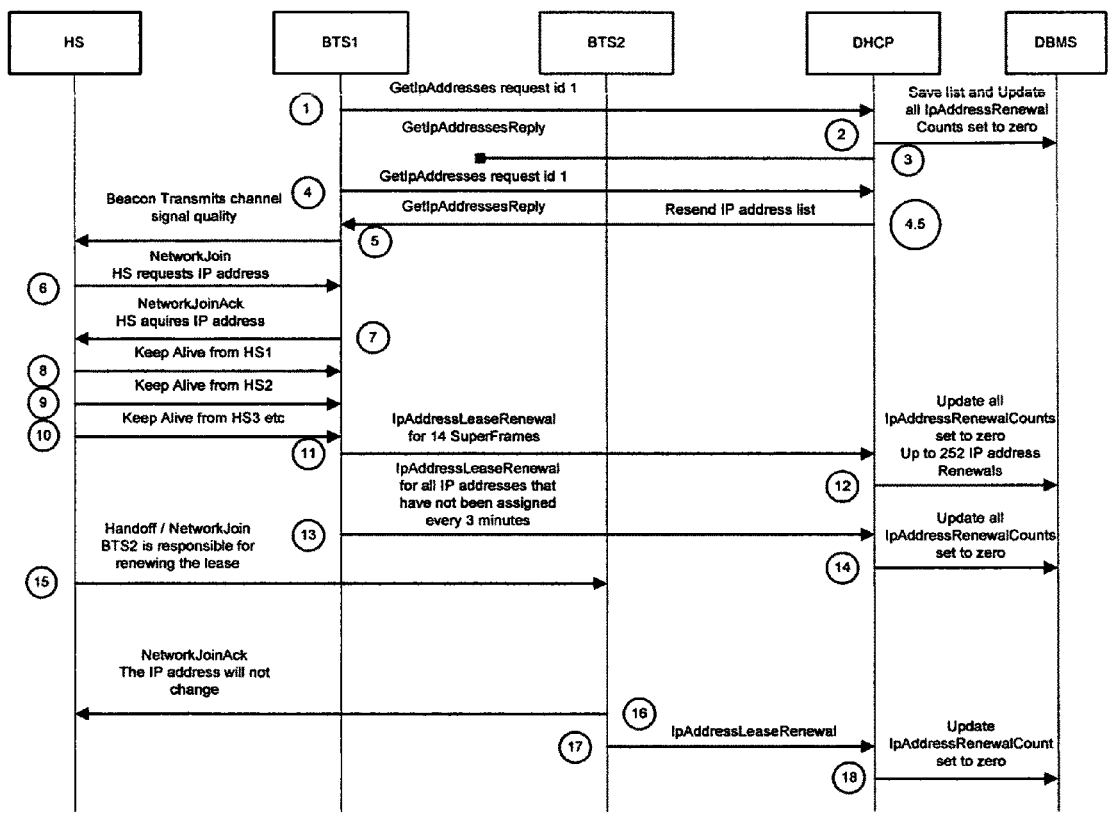

In this section we present typical message exchanges involved in this proxy DHCP solution. FIG. 4 illustrates the messages exchanged.

IP Address Assignment to the Base Stations: Upon powering up, the base station sends a GetIpAddresses message (1) to the proxy server. On receiving the message, the server will query the DBMS and update the fetched IP addresses by setting the IpLeaseRenewCount column to zero and save the list of IP addresses for future use (2). If the DhcpGetIpAddressesReply is not received in three seconds by the BTS (3), the BTS will send another GetIpAddresses message and wait for a reply (4, 4.5). This will continue until a reply is successful. Once the BTS has IP addresses available to assign, the BTS will start broadcasting beacons over the air waiting for handset (HS) network joins to occur (5,6,7).

IP Address Assignment to Handsets: When a handset starts up, it listens for a beacon from the base stations (5). The handset might receive multiple beacons on multiple channels. Upon selecting the best possible channel to join the network, the handset sends a network join message (6). The network join message serves as an implicit request for the IP address. On receiving the network join message the base station sends an acknowledgment that includes the IP address assigned for the handset (7).

IP Address Lease Renewal: For yet to be assigned IP addresses, the base station sends a lease renewal once every 3 minutes (13 and 14). In addition, it sends lease renewals based on the keep-alive messages received from the handsets (8, 9, and 10). Multiple lease renewals are aggregated into single a message. Aggregation is performed over keep-alive messages received in 14 super-frames (11). The proxy server, on receiving a lease renewal, updates the LeaseCounter of corresponding IP addresses to zero (12).

Handoffs: When a handset handoffs from BTS1 to BTS2, shown in FIG. 3, then the responsibility of sending lease renewals for that particular handset rests with BTS2. Whenever a keep-alive message is received by BTS2 it includes the corresponding IP address in the aggregated lease renewal message (17).

For ensuring high reliability of the proxy DHCP solution, the server module should be running on a redundant hardware configuration. In this section we describe the behavior of the IP address assignment mechanism in the event of various types of failures.

Non-Gracious Departure of Handsets: If a handset leaves a network without informing the base station that it is associated with then a message to free the particular IP address is not sent to the proxy server. As a result, the IP address is not considered for reassignment immediately. However, when the lease counter of that particular IP address exceeds 8 it will be considered for reassignment.

Crash Failure of Base Stations: A base station might crash due to a power failure, hardware component failure, or fatal errors in the software system. Whenever a base station crashes it fails to transmit the beacon at the start of every super-frame. In such scenarios, the handsets would detect that the base station is not operational in a finite amount of time. As a result, they might handoff to other base stations in the same subnet or leave the network. For handsets that are able to handoff to other base stations in the same subnet, they will be able to renew their IP address lease renewal through the keep-alive messages.

Crash Failure of Proxy Sever: If the proxy server was to fail, then any attempt from the base stations to obtain IP addresses would fail also. As a result, the base stations will send a critical alert to the xMonitor when they run out of available IP addresses.

Thus this disclosure described the design of a fault-tolerant proxy server that efficiently assigns and reclaims IP addresses in mobile switching centers that employ a proxy-DHCP solution for IP address allocation.

Since certain changes may be made in the above described system and method for a mobile switching center to efficiently manage; assign; and reclaim the IP addresses without departing from the scope of the invention herein involved, it is intended that all matter contained in the description thereof, or shown in the accompanying figures, shall be interpreted as illustrative and not in a limiting sense.

What is claimed is:

1. A system for decreasing the latency in the IP address assignment process using mobile switching centers to manage, assign, and reclaim IP addresses for mobile wireless networks using IP as a network layer protocol comprising:
one or more base stations;
one or more mobile switching centers;
one or more mobile devices;
each of said one or more said mobile switching centers in wired or wireless communication with one or more sub networks of said one or more base stations;
each of said one or more mobile switching centers having a pool of IP addresses and assigning, a separate sub pool of IP addresses from said pool of IP addresses to each of said one or more base stations in each of said sub networks;
one or more mobile devices in wired or wireless communication with one of said one or more base stations;
each of said one or more base stations assigning an IP address from the separate sub pool of IP addresses to each of said one or more mobile devices such that as said one or more mobile devices transfer wired or wireless communication from a current base station to a new base station within said sub network said one or more mobile devices do not have to be assigned a new IP address and said new base station sends a message to said mobile switching center that the IP address is now included in the new base station's separate sub pool of IP addresses;
wherein when said one or more mobile devices transfer wired or wireless
communication from a current base station to a new base station outside said sub network said one or more mobile devices sends a message requesting a new IP address assignment from said new base station, said new base station assigns a new IP address from said new base station's separate sub pool of IP addresses, and said one or more mobile devices sends a message to said current base station relinquishing the old IP address;
wherein each of said one or more base stations has an IP address timer and each of said one or more mobile devices sends a periodic keep alive message to said one or more base stations such that when a base station assigns an IP address to a mobile device said base station's IP address timer is set to a time that is counted down until said base station receives a keep alive message from said mobile device indicating said mobile device is still in use at which point the IP address timer resets and begins counting down again, or if no keep alive message is received by said base station the IP address timer counts to zero at which point the IP address is unassigned from said mobile device and is available to reassign to a different mobile device;
wherein each of said one or more base stations sends requests to said mobile switching center of said base station's sub network for assignment of additional IP addresses when said base stations sub pool of IP addresses decreases to a set threshold;
wherein each of said one or more base stations sends requests to said mobile switching center of said base station's sub network for IP address renewal for IP addresses where said one or more mobile devices have sent a keep alive message within a set time period; and,
wherein each of said one or more base stations sends messages to said mobile switching center of said base station's sub network listing IP addresses where said one or more mobile devices have not sent a keep alive message within a set time period or have sent a network leave message such that said mobile switching center can manage, assign, and reclaim IP addresses.

\* \* \* \* \*